Patented Sept. 8, 1925.

1,552,472

UNITED STATES PATENT OFFICE.

GUILLAUME DE MONTMOLLIN, EMIL REBER, GÉRALD BONHÔTE, AND JOSEF SPIELER, OF BASEL, SWITZERLAND, ASSIGNORS TO SOCIETY OF CHEMICAL INDUSTRY IN BASLE, OF BASEL, SWITZERLAND.

4-HYDROXYNAPHTHALENE-1-ARYLKETONES AND PROCESS OF MAKING SUCH PRODUCTS.

No Drawing.     Application filed January 30, 1923. Serial No. 615,936.

*To all whom it may concern:*

Be it known that we, GUILLAUME DE MONTMOLLIN, EMIL REBER, GÉRALD BONHÔTE, and JOSEF SPIELER, all citizens of the Swiss Republic, and residents of Basel, Switzerland, have invented new and useful 4 - Hydroxynaphthalene - 1 - Arylketones and Process of Making Such Products, of which the following is a full, clear, and exact specification.

It has been found that 4-hydroxynaphthalene-1-arylketones are obtained in a smooth manner if derivatives of the 4-hydroxynaphthalene-1-arylketones, which contain acid groups in their 3-position, such as the 3-sulfonic acids and the 3-carboxylic acids of the 4-hydroxynaphthalene-1-arylketones, which are manufactured for example in accordance with the processes described in the U. S. Patent No. 1,453,659 issued May 1st, 1923, and the U. S. patent application Serial No. 575579, filed July 17th, 1922, are heated, preferably in the presence of a suitable liquid or diluent respectively. The compounds thus obtained correspond with the general formula:

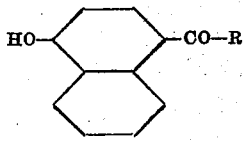

in which R is an unsulfonated and uncarboxylated aryl radical which neither contains sulfo- nor carboxyl groups, but which may contain other substituents. They represent whitish powders which dissolve in caustic soda solution to a yellow solution.

The following examples illustrate the invention without, however, restricting the same.

Example 1.

100 parts of the 1-phenylketone-4-hydroxynaphthalene-3-sulfonic acid are heated in a closed vessel with 400 parts of sulfuric acid of 5% strength at 180–190° C. There is obtained the 4-hydroxynaphthalene-1-phenylketone nearly pure which may be crystallized from benzene.

Example 2.

100 parts of the 1-(2'-chloro)phenylketone - 4 - hydroxynaphthalene - 3 - carboxylic acid are heated cautiously with 100 parts of dimethylaniline at 110–150° C. until evolution of carbon dioxide has ceased. From the cooled mass there crystallizes the 1-(2'-chloro)phenylketone-4-hydroxynaphthalene. Recrystallized from acetic acid it melts at 216° C., the corresponding 1-(4'-chloro)-phenylketone-4-hydroxynaphthalene at 210° C., and the 1-(2', 4'-dichloro)phenylketone-4-hydroxynaphthalene at 222° C.

Example 3.

100 parts of the 1-chloro-2, 1'-dinaphthylketone-4'-hydroxy-3'-carboxylic acid are heated in a closed vessel with 300 parts of sulfuric acid of 5% strength at 180–190° C. There is obtained the 1-chloro-4'-hydroxy-2, 1'-dinaphthylketone nearly pure which when crystallized from dilute acetic acid melts at 213° C.

Example 4.

100 parts of the 4, 4'-dihydroxy-1, 1'-dinaphthylketone-3, 3'-dicarboxylic acid are heated slowly with 400 parts of dimethylaniline at 150° C. until evolution of carbon dioxide has ceased. The 4, 4'-dihydroxy-1, 1'-dinaphthylketone liberated from the dimethylaniline may be crystallized from water as a sodium salt or, for example, from acetic acid as a free acid.

What we claim is:—

1. The herein described process for the manufacture of 4-hydroxynaphthalene-1-arylketones consisting in heating derivatives of the 4-hydroxynaphthalene-1-arylketones which contain acid groups in their 3-position.

2. The herein described process for the manufacture of 4-hydroxynaphthalene-1-arylketones consisting in heating derivatives of the 4-hydroxynaphthalene-1-arylketones which contain acid groups in their 3-position in the presence of a diluent.

3. The herein described new 4-hydroxynaphthalene-1-arylketones of the general formula

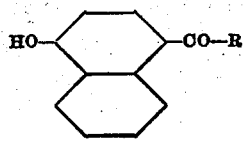

in which R is an unsulfonated and uncarboxylated aryl radical containing at least one halogen atom, which represent whitish powders dissolving in caustic soda solution to a yellow solution.

4. The herein described new 4-hydroxynaphthalene-1-arylketones of the general formula

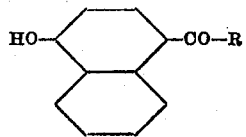

in which R is an unsulfonated and uncarboxylated benzene nucleus containing at least one halogen atom, which represent whitish powders dissolving in caustic soda solution to a yellow solution.

In witness whereof we have hereunto signed our names this 17th day of January 1923.

GUILLAUME DE MONTMOLLIN.
EMIL REBER.
GÉRALD BONHÔTE.
JOSEF SPIELER.